Jan. 3, 1933.   F. F. WASHBURN   1,893,258
LAWN PERFORATOR
Filed July 28, 1932

Inventor

F. F. Washburn

By Clarence A. O'Brien
Attorney

Patented Jan. 3, 1933

1,893,258

UNITED STATES PATENT OFFICE

FRANKLIN F. WASHBURN, OF PORTLAND, OREGON

LAWN PERFORATOR

Application filed July 28, 1932. Serial No. 625,414.

This invention relates to a tool for punching holes in a lawn or the like, the general object of the invention being to provide a plate-like head having spikes or prongs attached thereto and a handle connected with the head, whereby holes can be punched in the sod of a lawn or the like to permit air and water to reach the roots of the grass and also to permit fertilizer to reach said roots.

This invention also consists in certain other features of construction and in the arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1:
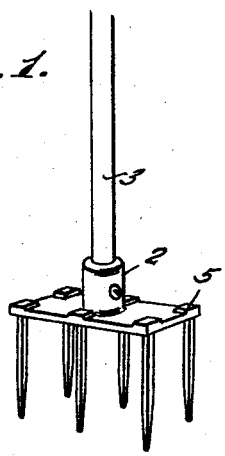
Figure 1 is a perspective view of the device.
Figure 2:
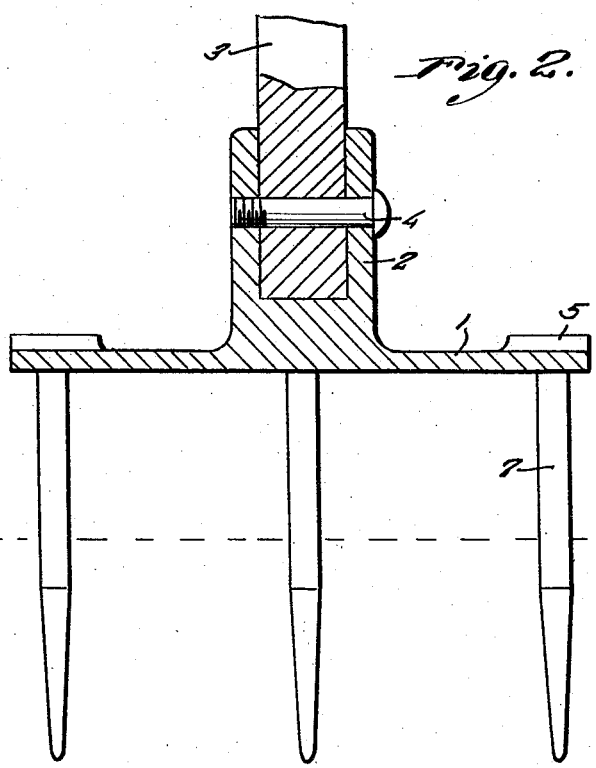
Fig. 2 is a longitudinal sectional view through the head portion of the handle.
Figure 3:
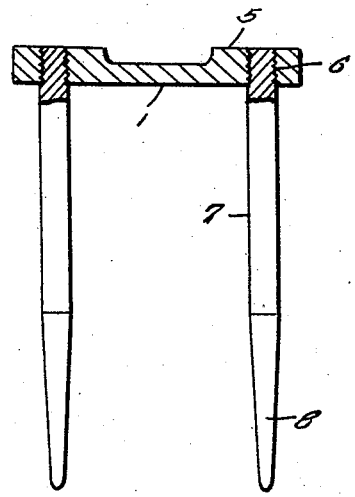
Fig. 3 is a transverse sectional view.
Figure 4:
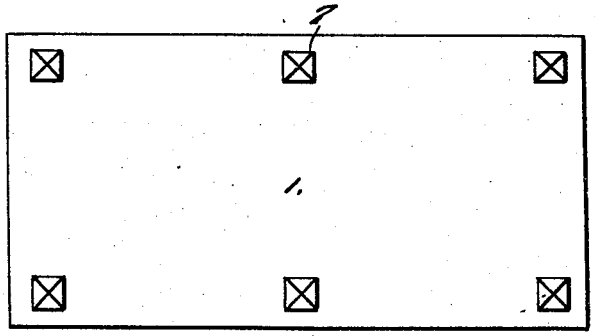
Fig. 4 is a bottom plan view.

In these views, the numeral 1 indicates a plate-like head having an upwardly extended socket forming portion 2 thereon for receiving a handle 3 which is fastened in the socket by a bolt 4. The upper face of the head 1 is formed with the spaced lugs 5 and threaded holes 6 pass through the lugs and the head for receiving the threaded upper ends of the spikes or prongs 7 which have their lower ends pointed as shown at 8.

Thus it will be seen that grasping the handle 3 and moving the tool downwardly with considerable force the spikes or prongs will penetrate sod of a lawn or the like so as to punch holes therein which will facilitate the entering of water to the roots of the grass and also will permit air to reach the roots as well as fertilizer.

The use of this device will prevent waste of water and of fertilizer, when fertilizer is used, and will also permit air to reach the roots so that the lawn will be prevented from becoming sour for lack of air and it will also prevent lawns from becoming sod bound which occurs when the grass roots are unable to expand and get air.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

A tool of the class described comprising a head made in the form of a plate having a centrally arranged socket forming member formed on its upper face for receiving a handle, spaced lugs formed on the upper face of the plate, said plate having threaded holes therein each of which passes through a lug and spikes having their upper ends threaded in said holes.

In testimony whereof I affix my signature.

FRANKLIN F. WASHBURN.